March 17, 1964     F. A. KOMATAR     3,125,291
HIGH-SPEED COUNTER
Filed April 9, 1962     6 Sheets-Sheet 1
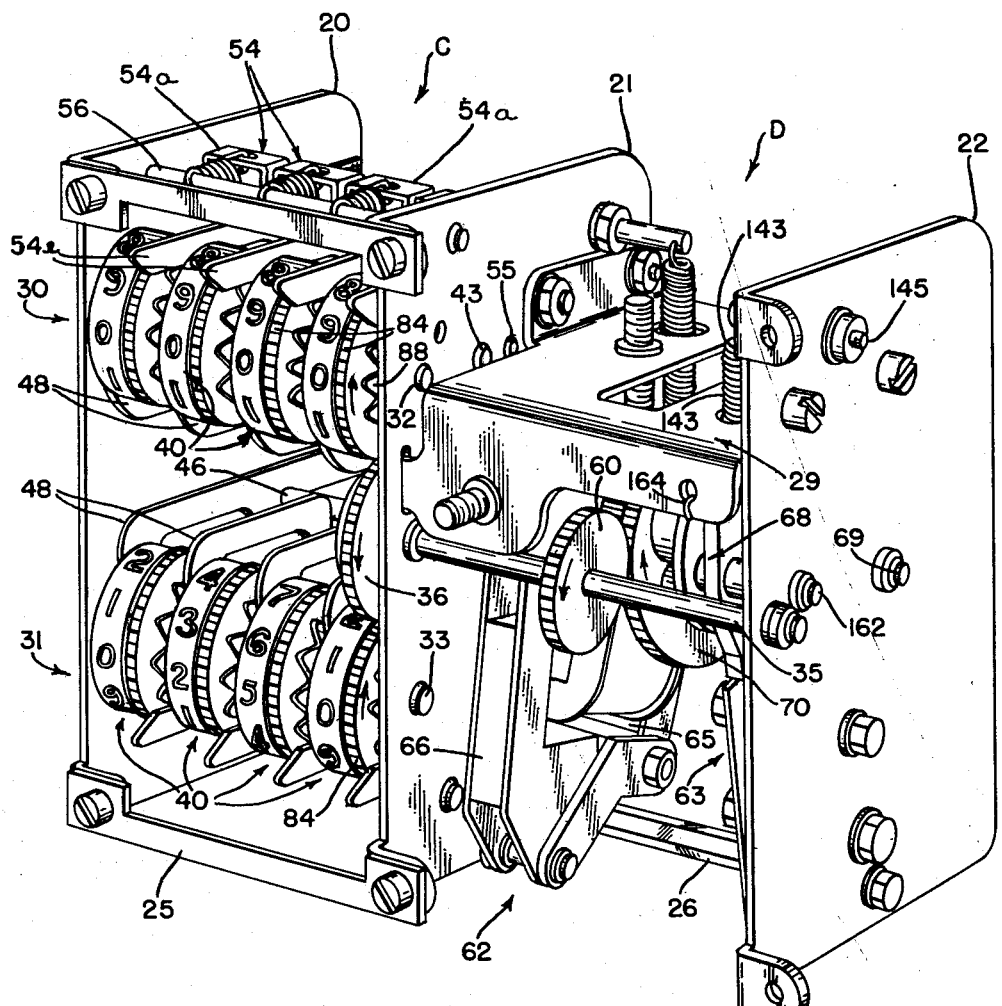
FIG. I
*INVENTOR.*
FREDERICK A. KOMATAR
BY *Williams, Tilberry & Golrick*
ATTORNEYS

March 17, 1964  F. A. KOMATAR  3,125,291
HIGH-SPEED COUNTER
Filed April 9, 1962  6 Sheets-Sheet 2
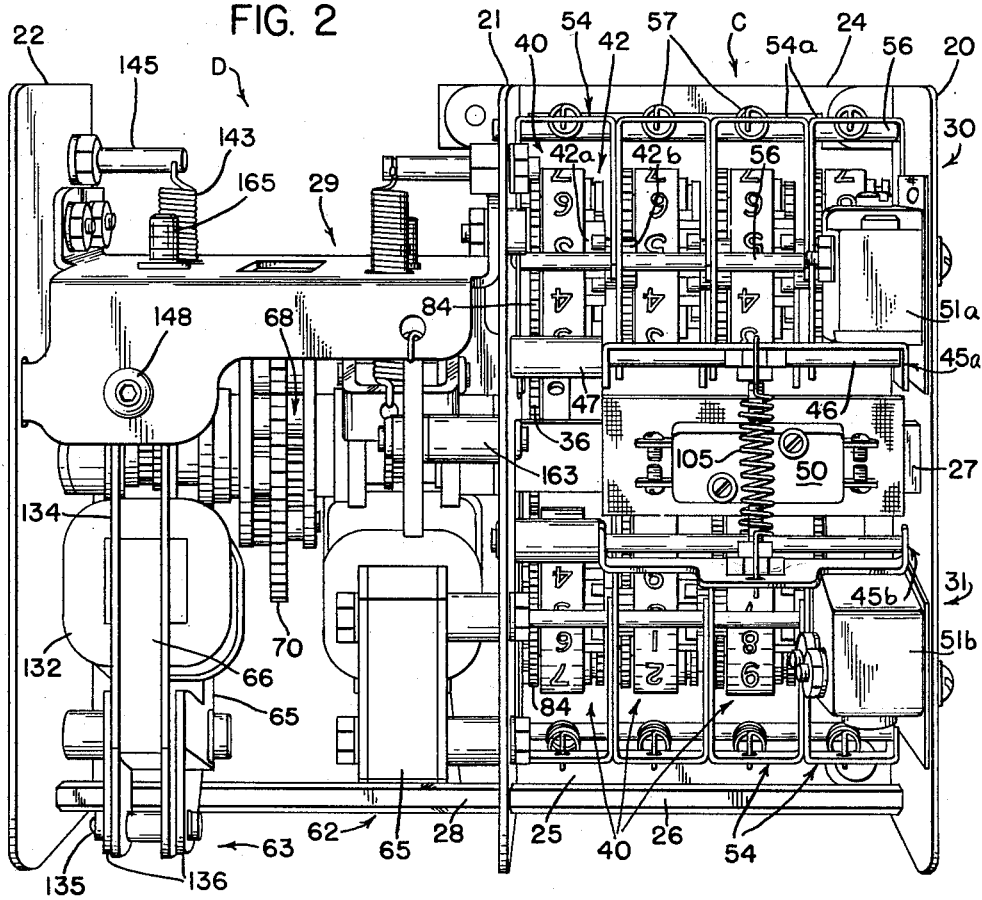
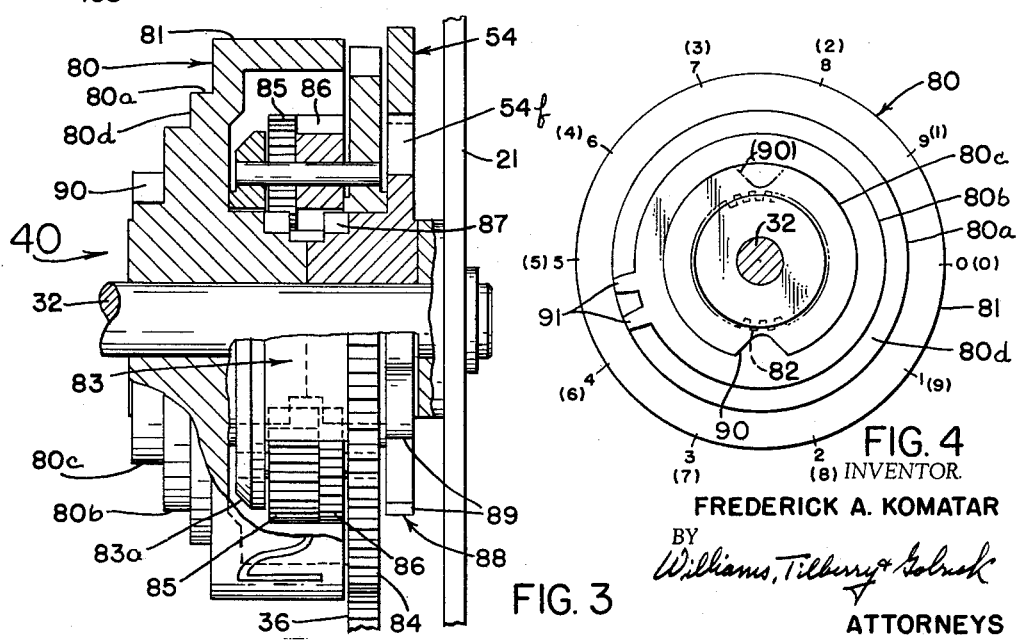
INVENTOR.
FREDERICK A. KOMATAR
BY Williams, Tilbury & Golrick
ATTORNEYS March 17, 1964 F. A. KOMATAR 3,125,291
HIGH-SPEED COUNTER
Filed April 9, 1962 6 Sheets-Sheet 5

INVENTOR.
FREDERICK A. KOMATAR
BY Williams, Tilbury & Golrick
ATTORNEYS

INVENTOR.
FREDERICK A. KOMATAR
BY
ATTORNEYS

United States Patent Office 3,125,291
Patented Mar. 17, 1964

3,125,291
HIGH-SPEED COUNTER
Frederick A. Komatar, East Moline, Ill., assignor to The Gamewell Company, Newton Upper Falls, Mass., a corporation of Delaware
Filed Apr. 9, 1962, Ser. No. 186,020
14 Claims. (Cl. 235—132)

The present invention is concerned with visually indicating counting devices, and more particularly with improvements in counters of the type having two similar banks of count indicating wheels simultaneously driven by a common input representative of a quantity being counted so as to count or register in a complementary fashion, that is, as the count indication on one increases, that on the other correspondingly decreases. However, certain features of what is hereinafter specifically disclosed are also useful in other counter environments.

Counter devices of the aforementioned are well known to the prior art, many having an input shaft commonly driving the two banks of number wheels. Such are used for example as "add-subtract" counters in one general mode of operation; or in another mode, as "predetermined count" counters, or as "repeating predetermined count" counters.

The described type of counter is used as a "continuous count" counter or "repeating predetermined count" counter, for example, in counting out objects into stipulated lots, in the following manner. The objects pass a detector developing respective impulses which are transformed into a counter input rotating the wheel bank driving shaft in one or the other direction, to cause one bank initially set at zero to advance, and the other initially set at a predetermined number, say 100 desired per lot, to decrease correspondingly, until 100 objects have been counted. At that time one bank then develops an output signal effective to actuate an external device, such as a gate diverting to another discharge path following objects pertaining to a subsequent lot at the same time causing a transfer or reversal of the count functions between the banks. For the second lot the bank which had counted up to 100 then counts down toward zero while the other advances from zero until another 100 objects is counted, at which time a similar control output signal is developed, the functions are again transferred or reversed; and so on as counting continues.

A counter of this type finds application as an add-subtract counter, for example, in keeping a running count of the objects and the capacity for the further acceptance of objects in a storage space, in conjunction with a system whereby objects passing into and out of the storage space are individually detected to produce correspondingly signals, and the "in" signals and the "out" signals are applied to the counter input in opposite senses to effect respective changes in the count indicator banks.

Thus, considering the storage capacity to be 900 units, if at the start of operations the indicating wheel bank advanced by incoming objects is set to zero, and the other bank to 900, as 50 objects are put into storage they advance the first bank to "50" indicating the total number of objects in storage, the other bank turning back to "850" indicating the yet unused storage capacity. Thereafter, if fifteen objects are withdrawn, the banks are turned in reverse sense to decrease the in-storage count indication to "35" and increase the available-capacity count to "865"; with of course on further deliveries or withdrawals similar corresponding actuations occurring. Hence the two banks always indicate the quantity in storage and the remaining storage capacity.

In such an add-subtract arrangement there may also be included means responsive to the bank settings to give say a warning signal when the storage capacity is exhausted; or conversely, a warning when the area is completely empty.

Mechanical counters of this type, known to the prior art for achieving these results or functions, have had various functional and structual disadvantages. For example, in the repeating predetermined count counters, purely mechanical transfers of the counting function from one bank to the other have had an inherent limitation on the speed at which the continuing count can be made, generally in consequence of inertia or unreliability in the mechanical system for the count transfer and for effecting control of an external device; resulting for example in faulty counting into the desired lots, when objects are delivered at too high a rate. The disclosed device transfers the count function by electric switch means for increased speed and reliability and to eliminate in great degree inertial limitations.

On the other hand, with known add-subtract counters, where two events occur simultaneously or even in close succession requiring respectively an add and a subtract actuation, except in rather complex counter structures, there is often difficulty in obtaining a correct count, in consequence of a preferential recording of one of the events with omission of the other. The actuating system hereinafter disclosed includes a differential assembly providing a rotational input through a counter input shaft commonly driving both wheel banks, which correctly accounts for even simultaneous events.

Further in known counters of this type, the resetting of the banks to desired numbers is usually at least relatively time consuming, due either to extended manipulation required in disconnecting the number wheels from associated gearing to permit rotation, or in the very rotation of the wheels, especially where the wheels are not disconnected from associated gearing, or both, the double bank augmenting the problem. A novel finger lever actuated mechanism for setting each wheel independently minimizes this problem.

The general object of the present invention is to provide an improved counter of the type described having two similar banks of counting wheels simultaneously driven to count in complementary fashion. Another object is to provide a counter of the type described adapted for high speed operation, yet relatively simple in construction. Another object is to provide a counter of the type described adapted for repeating predetermined count operations wherein at the end of a pre-determined count cycle there is effected, by primarily electrical means, a transfer from one bank to the other of the functions first, of counting and secondly of developing an output signal for control of an external device at the end of a subsequent count cycle. Another object is the provision of a counter of the type described which is readily adaptable by a mere change of terminal wiring connections to operate as either an add-subtract counter or a repeating predetermined count counter. A still further object is the provision of an improved reset arrangement for each bank of counting wheels. Other objects and advantages will appear from the following description and the drawings wherein:

FIG. 1 is a front perspective view, taken from the right and slightly above, of a counter unit, embodying the present invention, with the usual front cover and the casing removed;

FIG. 2 is a back perspective view of the unit;

FIG. 3 is an edge elevational view of a number wheel assembly, partly broken away to show certain internal structure;

FIG. 4 is an end view of a wheel assembly of the upper bank of the counter taken as indicated by the lines 4—4 in FIG. 3;

Figure 5:
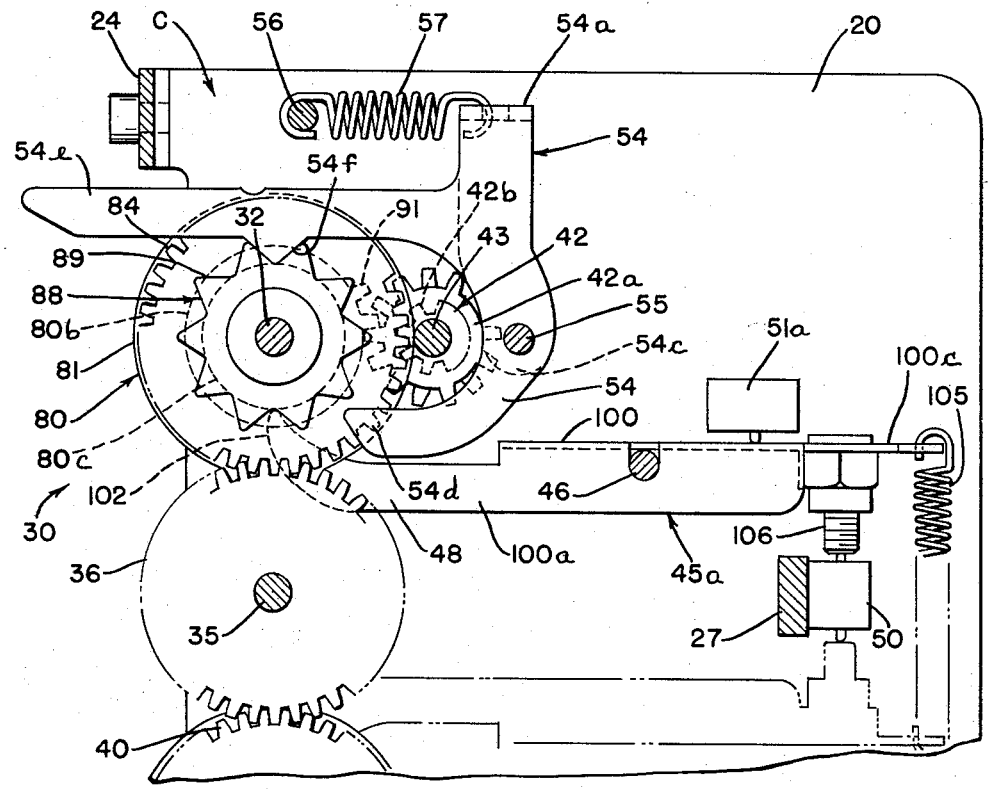
FIG. 5 is a detail view in elevation of the number wheel reset mechanism for the top bank unit wheel, showing also the count transferring switch plate for the upper bank.

In the drawings, there is shown a counter unit embodying the present invention adapted to counting operations where each unit quantity is presented to the unit as an electrical impulse. Ths general arrangement of primary components and assemblies therein is apparent in FIGS. 1 and 2 where the unit is shown with front cover, casing and a rear terminal block removed.

*General Organization*

The unit of the drawings as shown is comprised of a counting section C and a drive or actuating section D; the components or assemblies thereof being respectively disposed between the left end and center plates 20, 21, and center and right end plates 21, 22, with the plates held together in a rigid framework in section C by the spacer bars 24, 25, 26 and transfer switch supporting bar 27 secured therebetween, and in the drive section by the magnet stop plate 29 and the bottom spacer bar 28 aligned with 26. Unless otherwise stated various shafts hereinafter mentioned are all parallel and axially secured between the plates of the section to which they pertain.

At the front of the counting section, generally similar upper and lower banks 30, 31 of four decimal digit number wheel assemblies 40 mounted and rotatable on respective parallel shafts 32, 33, are commonly driven from a drive shaft 35 journalled with suitable bearings in center and end plates 21, 22 through a gear 36 meshing with gears 84 of the lowest order or unit wheel assembly of each bank. Between each adjacent pair of wheel assemblies there is the well known Geneva type tens transfer means including gear wheels 42 mounted on a rearward shaft 43 secured endwise in the plates 21, 20 in parallel relation to the bank shafts 32, 33 and drive shaft 35.

Count transfer switch plates, indicated by the general reference numerals 45a and 45b for the plates associated respectively with the upper and the lower banks, are pivotally mounted on and axially positioned by a spacer sleeve 47 on a shaft 46, each with a set of fingers or feelers 48 riding on a coaxial singly-notched peripheral surface of respective wheel assemblies in the associated bank. Each plate is spring-biased to shift pivotally upon alignment of all four wheel notches, as for example, at a zero bank indication, and actuate a count transfer switch 50 rigidly mounted on the bar 27, and also an associated switch 51a or 51b mounted on plate 20 to develop an output pulse or otherwise to actuate a controlled external device.

Associated with each wheel bank is a "reset" means for setting each wheel independently of the others in the bank and without any manipulations to disconnect gearing between the wheels or between the banks and the drive shaft. The reset means for each bank includes a set of four levers 54 individually pivotally mounted on a common shaft 55 and by a common stop bar 56 limited in movement induced by biasing springs 57; the levers having a portion projecting at the front (through the cover when in place) for manual reset operations as hereinafter described.

The upper and lower banks of counting wheel assemblies, and the respectively associated mechanisms are essentially identical in function and structure except for orientation of certain features, hereinafter described in detail for the right and left hand aspects of the reset levers and certain formations or indicia in the wheel assemblies, arising from or imposed by the fact that the upper and lower halves of the counter sections are symmetrical relative to a horizontal centerplane.

In the drive section D the right and left halves on opposite sides of a vertical centerplane through the gear 60 on the drive shaft, are essentially identical. As viewed from the front the drive section includes the left and right hand actuator assemblies 62, 63 for converting incoming count pulses into respective rotational displacements of opposite sense of the drive shaft 35. As subsequently further described in detail with respect to the mechanism 63, each includes an electromagnet 65, mounted on an adjacent plate 21 or 22, and pivotally supporting the lower end of an armature bearing arm 66, the applied pulse induced swinging movement of which is translated by a pawl and ratchet means into rotary displacement of a differential assembly 68 rotatable on a shaft 69 and having an external spur gear formation 70 meshing with the gear 60 on the drive shaft 35.

The direction of pawl action in the actuating assemblies 62 and 63 being reversed, rotation of the drive shaft 35 and therefore of the number wheels is thereby effected in respective opposite senses. The actual result is that count impulses applied to 62 rotate the differential assembly counterclockwise on shaft 69, thereby causing the upper or "count" bank 30 to count up and the lower or "predetermined count" bank 31, although rotating in the same mechanical sense, to count down by virtue of the reversed ordering of the numerals on the wheels. Conversely, impulses applied to 63 cause the lower bank 31 to count up while the upper bank 30 counts down towards zero. It may be here noted that if only repeating predetermined count operation is desired, with suitable modifications in the pawl mechanism this differential assembly may be omitted.

*Wheel Assemblies and Tens Transfer Means*

The number wheel assemblies being basically identical, only the unit assembly in the upper bank and its relation to the associated reset mechanism, switch plate, and tens transfer are described.

The novel construction of the wheel assembly (see FIGS. 3 and 4) includes a cylindrically flanged member 80 rotatable relative to shaft 32 and bearing numerical indicia appropriate to the base of the numerical system used, here 0–9 for the decimal system with respect to which the rest of the unit is described. About a coaxial hub spur gear formation 82, the flange defines an annular space receiving a cage or carrier member 83 integral and cooperating with a spur gear disk 84, to support on suitable shaft pins between the disk 84 and an inner end ring 83a, four identical pinions in diametrically opposed sets.

Each set includes meshed pinions 85, 86 in turn respectively in mesh with the gear 82 and with a spur gear formation 87 (here identical in number of teeth with 82) of a locking wheel 88 rotatably supported on shaft 32. Integral with the gear formation 87 inserted into the end of the carrier, the locking wheel has a series 89 of ten triangular locking teeth (see FIG. 5).

At the left end of member 80 are three coaxial formations of successively reduced diameter 80a, 80b, and 80c;

the cylindrical periphery of 80c being interrupted by a switch plate finger receiving notch 90 and that of 80b by a pair of projecting Geneva teeth 91 forming part of the tens transfer means to the next higher order wheel. In FIG. 4 appears a substantially left end view of the wheel assembly showing the shape and spacing from the pair of Geneva teeth 91 of the notch 90 as dictated by the relative positioning and shape of the tens transfer wheel 42, the shape and location of the fingers on the switch plate 45a and by the location of the "zero" of the circumferential numeral series 0–9 for an upper bank wheel.

In any given bank these wheel assemblies will be identical for practical reasons of minimizing the number of stocked parts, although the teeth 91 being functionless can be omitted in the highest order wheel.

With this arrangement, when the locking wheel 88 is held against rotation and spur gear 84 (and therefore carrier 83) is rotated by gear 36 for the unit wheel or a tens transfer wheel for the others, the member 80 is rotated at twice the speed in the same direction. On the other hand, when spur gear 84 is restrained and the locking wheel rotated, the number bearing member 80 is rotated at the same speed in the opposite direction.

On each tens transfer wheel 42 (see FIGS. 2 and 5) a larger diameter toothed portion 42a is positioned for interconnected engagement by Geneva teeth 91 of one wheel, and a toothed portion of smaller diameter 42b is in mesh with the spur gear formation 84 of the adjacent next higher order wheel assembly in a usual arrangement with gearing ratios from member 80 in the lower order wheel to member 80 in the adjacent next order wheel selected so that the latter is advanced one-tenth of a turn, therefore one numeral, per turn of the former.

In the particular arrangement here shown, although the transfer wheels 42 are neither axially nor rotationally fixed relative to their support shaft 43, since the length is substantially equal to the axial spacing between that radial shoulder 80d defined between 80a and 80b on one wheel and the free edge of the indicia bearing flange of the next wheel, each wheel 42 is held captive against any substantial or unwanted axial movement between such surfaces.

The structure of the wheel assemblies in the lower bank, is the same as in the upper, except that the numerical indicia are reversely ordered in the lower bank because the wheels simultaneously turn in the same direction; and that, because of the symmetry about the horizontal centerplane, the switch plate finger receiving notch is located at a corresponding position; as indicated by the parentheses-enclosed numerical series 0–9 and reference numeral (90), superimposed upon FIG. 4 for purposes of comparison.

Reset Mechanism

The reset mechanism for each bank comprises identical structures for each wheel assembly, also essentially identical for both banks except that the levers 54 assume right and left hand forms because of the inversion of the lever orientation in the lower bank.

FIG. 5 shows the reset mechanism for one wheel in the upper bank (see also FIGS. 1 and 2). The stamped metal lever member 54 is formed on its inner end to a square U-shape providing an apertured horizontal yoke portion 54a with depending legs 54b and 54c, each apertured to receive the shaft 55. The left leg (as seen in FIG. 2) 54b is extended downwardly and forwardly to a shaped tip 54d swingable through an arcuate path to engage one of the teeth 89 and advance one unit on the locking wheel 88 upon a raising of the lever against the bias of spring 57 simultaneously lifting the lock point 54f from the wheel. The lock point 54f on the lever arm, shaped complementary to the locking teeth interspace, upon spring biased engagement therein assures that the wheel numerals appear at a definite predetermined viewing position.

Since the spur gear 84 in a wheel assembly is restrained (by engagement with the drive shaft gear 36 for a units wheel or for higher order wheels by frictional drag of the system through the transfer wheel), each numbered member 80 is rotatable to desired setting by appropriate stroking of the corresponding lever projection 54e.

Hence it is seen that the differential structure thus provided in each wheel assembly by the lock tooth 54f by cooperation of the lever arm 54 and lock wheel 88 permits the wheel assembly to be set to desired point merely by a finger manipulation of the lever which in effect frees the member 80 from all of the preceding gearing external to the wheel assembly and simultaneously imparts a resetting motion thereto, here a displacement of one digit per lever stroke.

Count Transfer Switch Plate and Switch

Since the switch plate assemblies 45a and 45b are essentially identical in their mounting, cooperation with the respective upper and lower wheel banks, and with the transfer switch 50 and the respective output switches 51a and 51b, only switch plate 45a is here described, with reference to FIGS. 1, 2 and 5.

The plate 45a includes a body portion 100 with parallel side flanges 100a apertured to receive shaft 46, and four equi-spaced parallel feelers or fingers 48 extending forwardly and curving into tip portions 102 riding on the formations 80c of respective wheels under the biasing action of a tension spring 105 with ends hooked through apertured rear projections 100c on the respective plates; so that when all four wheel notches 90 come into mutual alignment coincident with the tips, the latter enter the notches causing the plate to swing about the shaft 46.

A screw 106 vertically adjustably threaded through body projection 100c upon such plate pivoting actuates the maintained contact type switch 50 to throw it from one preexisting condition to a second possible condition or setting for the count transfer purposes hereinafter to be described.

The output or control signal switch 51a actuated by plate 45a, preferably vertically adjustably mounted on the adjacent wall 20, has an actuating button in contact with the plate 45a and responsive to its movement. The two switches 51a, 51b are connected to each other for two point operation in developing a signal for control of an external device, in other words, so that actuation of either by a pivoting plate will develop an output signal, that is, a condition suitable to effect a desired control operation.

Differential Assembly in Drive Section

Figure 6:
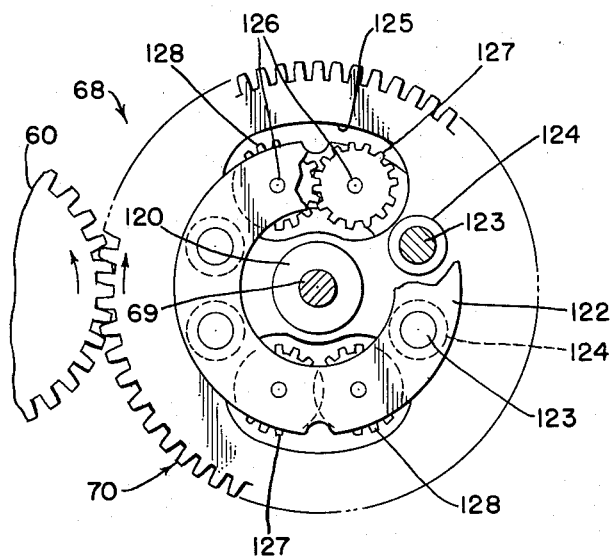
FIG. 6 is an end elevational view of a differential assembly comprising a part of a counter actuating mechanism.
Figure 7:
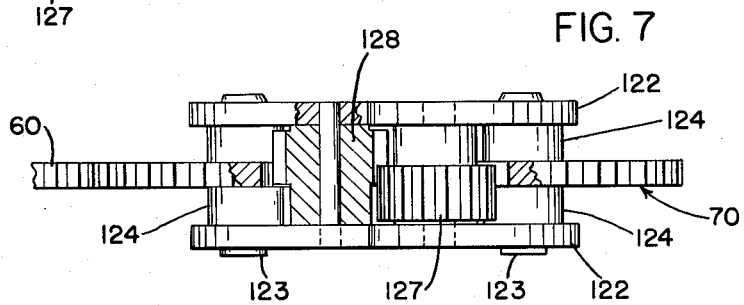
FIG. 7 is an edge view corresponding to FIG. 6 with certain parts broken away to show internal structure.
Figure 8:
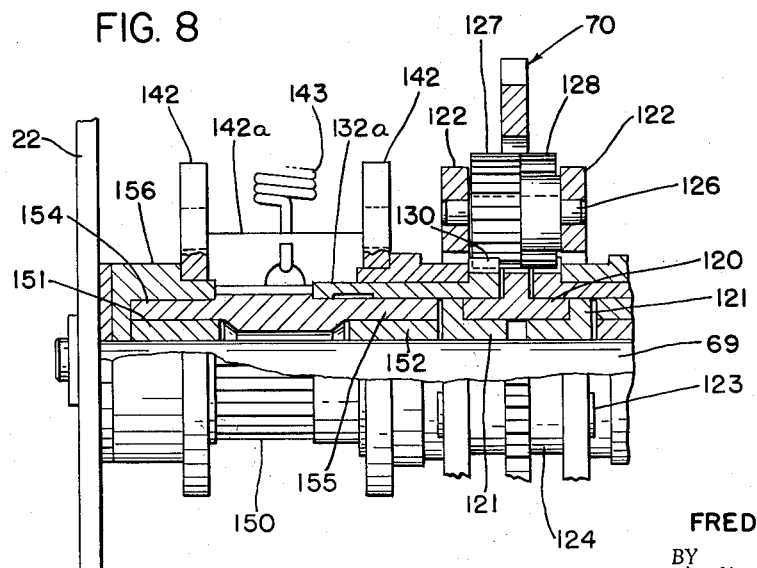
FIG. 8 is a detail view of one ratchet arm assembly in the drive or actuating mechanism including a fragmentary representation of the differential assembly.
Figure 9:
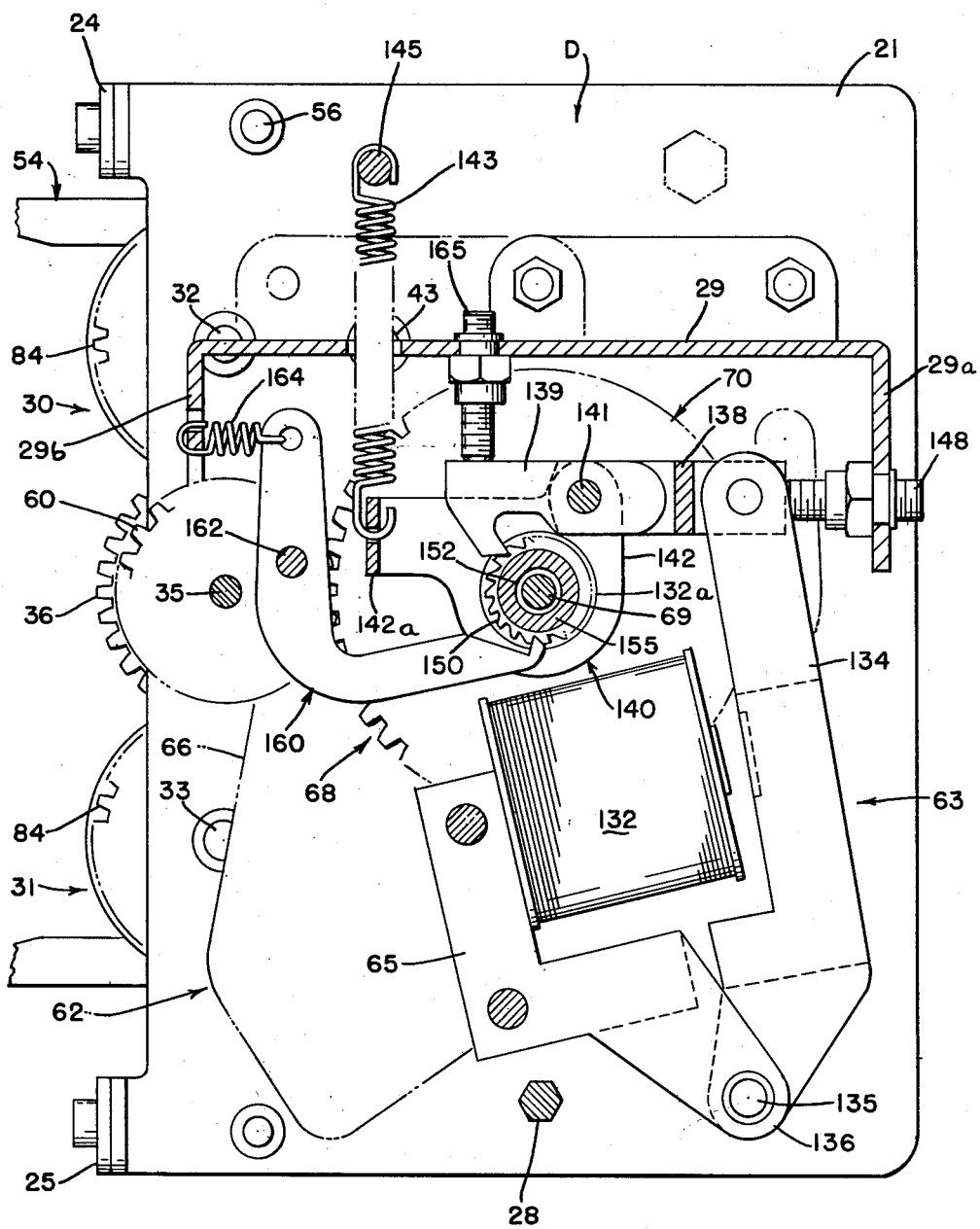
FIG. 9 is a detail elevational view of a magnetically actuated drive pawl and locking pawl mechanism cooperating with the ratchet assembly of FIG. 8.

The differential assembly (see FIGS. 6, 7 and 8), in basic structure similar to the differential mechanism used in a counter wheel assembly, is provided as a means for inducing in counter input shaft 35 angular or rotational displacements derived from count signal pulses by the identical electromagnetic actuator mechanisms 62 and 63, described relative to FIG. 9.

The differential assembly is comprised of a centrally located spur gear plate 70 with a hub portion 120 in the opposite ends of which are received bearings 121 journalling the same on the differential shaft 69 and having respective end flanges over the hub ends providing thrust bearing portions for other elements to be described.

A pair of frame rings 122, 122, secured in axially equi-spaced relation to the disk 70 by suitable rivets 123 passing through the plates 122, spacer sleeves 124 and plate 70, mount therebetween on shafts 126 diametrically disposed pairs of meshed differential pinions extending through plate openings as at 125, of which the diametrically opposed pinions 127, 127 and 128, 128 are meshed with respective differential input gears 130 extending into the assembly from opposite sides.

Impulse Converting Mechanism

In FIGS. 8 and 9 there is shown for the right mechanism 63 the specific means to convert an electric count signal or detection signal impulse into rotary motion of the counter section input shaft 35.

A count signal pulsed electromagnet 65, mounted on adjacent frame end plate 22 (see FIG. 2), has a C-shaped core with a coil 132 on its upper arm, and pivoted at 135 between spaced projections 136 of core side plates, a lever arm 134 formed by elongated side plates riveted to the armature iron 66. The top of the arm is pivotally connected to a tang of a generally horizontal link 138 having an opposite bifurcated end pivotally connected by pin 141 to a pawl 139 received therebetween and to the parallel ratchet arm side plates 142 of a ratchet wheel arm assembly 140. A vertically adjustable guide screw 165 is threaded downwardly through plate 29 to contact the top of drive pawl 139.

The assembly 140, rotatably supported on the fixed shaft 69, is biased by a tension spring 143—connected between arm yoke 142a and anchor pin 145 adjustably secured above stop plate 29 on plate 22—to rotate about shaft 69 in such fashion (clockwise in FIG. 9) as to return pawl, link and armature arm to the right to an initial position determined by adjustable stop pin 148 threaded through depending stop plate rear flange 29a after movement by pulses coil 132.

The ratchet wheel 150 is supported on shaft 69 by end bearings 151, 152 inserted in its reduced counterbored ends 154, 155 received respectively by the bearing 156 pressed into apertured left plate 142, and by a press fit in the tubular differential gear hub 132a; the latter in turn being journalled by bearing 158 pressed in the apertured right side plate 142.

A fixed shaft 162 projecting from an adjacent frame plate with interposed spacer sleeve 163 supports a roughly L-shaped lock pawl 160, biased by tension spring 164 between the pawl upper end and stop plate flange 29b to engage at its shaped lower end the teeth of ratchet wheel 150 for preventing wheel rotation counter to that caused by pawl 139.

Accordingly, when coil 132 is energized, attracting the armature arm 134, the ratchet wheel arm 142—142a is rotated counterclockwise against bias of spring 143, causing driver pawl 139 to move therewith guided or cammed by screw 165, ensuring that its wheel engaging tip drops behind the ratchet wheel as the pin 141 rises. When the pulse passes, the bias stretched spring in returning the arm 142 causes the now engaged drive pawl to turn the ratchet wheel, therefore differential input gear 131, through a certain angle to effect a one unit advance in the upper or "count" bank and a corresponding decrease in the lower or "predetermined count" bank, the ratchet teeth escaping under pawl 160.

The gearing ratios in the train from each differential input gear to the spur gears 84 are selected relative to the ratchet wheel rotation effected by a drive pawl operating stroke, so that each solenoid pulsing results in a one unit change in the unit wheels.

Continuous Count Circuit and Operation

Figure 10:
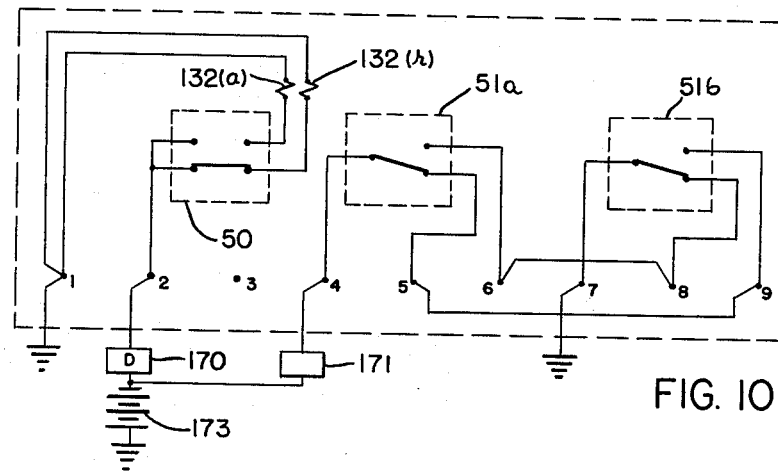
FIG. 10 is a schematic wiring diagram showing the counter elements electrically connected for continuous count or repeating predetermined count operation of the unit.

FIG. 10 shows the counter as wired when continuous count operation is selected, and cooperating circuitry with one side of both magnet coils, here designated 132(a) and 132(r) for the count advance coil in 62 and count reverse coil in 63 respectively, connected to an input No. 1 terminal, and other sides connected respectively to normally open and normally closed contacts at one end of switch 50, the opposite contacts therein being commonly connected to input terminal No. 2. The normally open contacts in 51a and 51b are respectively connected to terminals Nos. 6 and 9, and normally closed contacts to Nos. 5 and 8, and the respective switch arms to Nos. 4 and 7.

By way of simple example, the external detecting circuit might comprise a pressure actuated switch 170 closed by objects passing to one packaging station; and the count controlled device 171, an article switching gate for diverting counted objects from one station at a desired count completion to another. Then 170 is connected between terminal 2 and a battery 173 or other electrical power source; terminal Nos. 1 and 7 and the other side of the source connected to a ground element; count controlled gate device 171 connected between the battery and terminal No. 4; and Nos. 6 and 8, and 5 and 9 jumpered. The drawing shows settings of switches 51a, 51b in the condition prevailing with neither bank to zero and switch 50 maintaining at a setting applying pulses from an object detector 170 to the reverse count solenoid 132(r).

Assuming that a repeated count cycle of 250 objects is desired, the lower bank of wheels is set to "0250," and the upper to "0000" causing the notches 90 to align in the upper bank and thereby the switch 50 to be set to apply pulses from 170 to the advance coil 132(a); setting 51a as shown and 51b oppositely to what is shown.

As the first impulse is received turning the unit wheel from "0" to "1," the corresponding plate finger rides out of the notch 90 thereon, pivoting the plate and moving all fingers in the top bank and throwing 51a to normally open position, switch 50 maintaining its setting. Continuing pulses applied to 132a cause an increasing upper bank indication and a count down from 250 in the lower bank; until 250 on the upper "count" bank and zero on the lower "predetermined count" bank is reached, whereupon the fingers of plate 45b enter the aligned notches 90 in the lower bank, tilting plate 45b to throw 50 to the position shown to transfer the count pulses thereafter to 132(r) at the same time throwing 51b to the position shown completing a circuit from No. 4 to No. 7 to actuate 171. As further pulses are now applied to 132(r), the first again shifting plate 45b to carry all fingers out of the notches, throwing 51b to normally open contact and leaving 50 maintained in the position shown, the subsequent pulses then drive the banks in reverse sense, counting down on the upper bank and up on the lower, until the latter again reads 250 and the top bank zero, again throwing 50 to apply pulses to 132(a) and throwing 51a back to the position shown again to complete circuit from Nos. 4 and 7 and actuate 171; and so on with repeated cycles.

Add-Subtract Counter Operation

Figure 11:
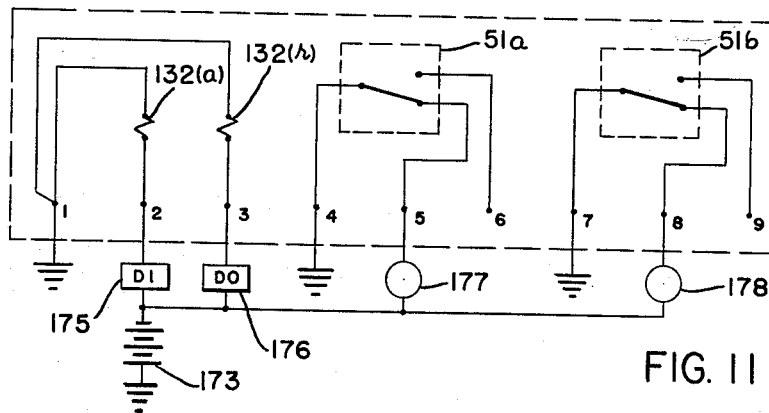
FIG. 11 is a schematic wiring diagram showing the connection which may be made for an add-subtract mode of operation.

FIG. 11 shows the counter unit as wired when an add-subtract operation is selected, the connections of 51a, 51b to the terminal block being as in FIG. 10, with the jumpers however omitted, and coils 132(a) and 132(r) now being connected from a common input terminal, No. 1, to Nos. 2 and 3 respectively, switch 50 here being non-functional. Nos. 1 and 7 are again connected to a ground or common wire, so also 4; and detectors 175, 176 are connected from the non-ground side of the battery 173 to Nos. 2 and 3, therefore to the remaining sides of 132(a) and 132(r) respectively.

This mode of operation might be used, for example, in a parking lot to give direct visual indication of the number of cars in the lot and the remaining available space. Assuming 250 car capacity, when the lot is empty the upper bank is set to zero, the lower to 250. Counts from say an "in" lane detector DI as 175 are applied only to 132(a) to advance the upper bank and count back from 250 on the lower; and counts from an "out" lane detector DO are applied to 132(r) to reverse or diminish the total on upper bank and increase that on the lower, so that the upper bank always shows the number of cars parked and the open capacity at any moment. In other words, the coils each have one side connected to an input terminal for respective circuits supplying impulses of opposite count sense.

With warning signals 177 and 178 connected from the battery to terminals Nos. 5 and 8, when the top bank reaches 250, therefore the bottom bank zero, entry of plate 45b fingers into aligned notches causes 51b to shift to normally closed position and activate warning signal 178, indicating that the lot is full. Conversely when the lot is emptied and upper bank reads zero, 51a actuates 177, indicating that the last car has departed.

In this mode of operation where pulses can arise simultaneously from both detectors, nonetheless a correct count will be obtained, since the differential assembly will absorb the opposed rotational outputs of the pulsed actuators without rotating the drive shaft 35.

Although the operation of the plates and associated switch means to transfer the counting function from one bank to the other can be effective by using switch 50 for actuation of a solenoid device to throw a sliding gear, driven by mechanical rotational impulses proportional to a counted quantity, from engagement with a direct rotational driving connection to the counter section input shaft into engagement with a reverse connection, or for actuation of some other device attaining this result, the previously described arrangement has been preferred for detailed disclosure of the invention since it appears to be of more general utility and greater flexibility in application.

*Combined Operation*

Where switch 50 is a double-pole double-throw switch, the unit is then adaptable for repeated add-subtract operation, in effect a combination of the two modes of operation already described. When a predetermined difference between "add" and "subtract" impulses, which difference is used for the number preset as in the described for continuous count, is reached the count function is transferred through action of switch 50 for a succeeding cycle with repetition.

Figure 12:
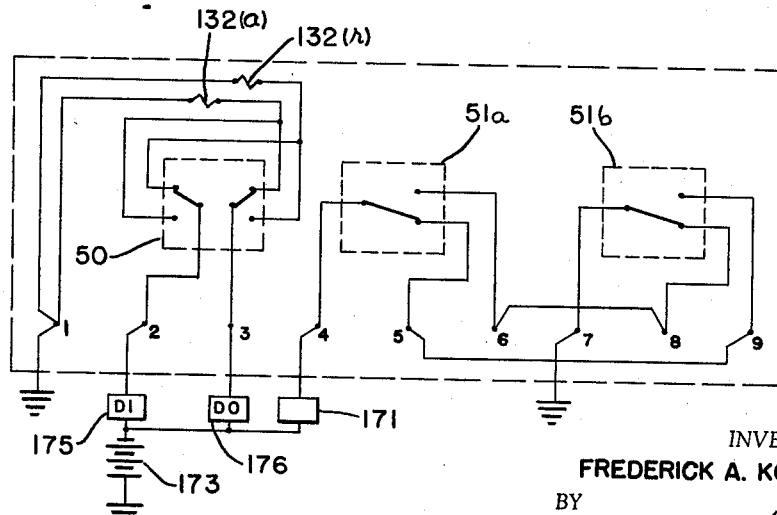
FIG. 12 is a modification of part of FIG. 10.

FIG. 12 shows a modification of FIG. 10 with transfer switch 50 a DPDT switch for this purpose. For simple repeating predetermined count counting, the input would be applied to only one pole as usual, for example 175 being the sole detector and the right side of 50 being unused in FIG. 12, resulting in the same circuitry as that in FIG. 10. For simple add-subtract operation, switch 50 of FIG. 12 would be unused, the two input lines being connected directly to coils 132(a) and 132(b) as in FIG. 11.

I claim:
1. A counting device comprising:
a first bank and a second like parallel bank of rotatable count indicating wheel means;
each wheel means including
 a rotatable number-bearing element having a hub gear formation and a surface coaxial therewith interrupted by a notch, and a two-tooth interrupted gear formation,
 a rotatable lock wheel having a gear formation like to the hub gear formation and a circumferential series of locking teeth,
 a rotatable carrier member having an external spur gear portion and located between said series and element and rotatably supporting a pair of like pinions meshed with each other and respective said formations;
the wheel means of one bank having numerals ordered in sense reversed from that of the other bank;
an input shaft driven gear meshed with the spur gear portion of the lowest order wheel means of each bank;
a transfer wheel between each adjacent pair of wheel means having
 a gear portion in mesh with the spur gear portion of the higher order wheel means and
 another gear portion positioned to be engaged by teeth of said interrupted gear;

reset means for each bank including for each wheel means
 a manually movable lever having a locking formation engageable with said locking teeth and spaced therefrom a lock wheel engaging formation advancing said lock wheel on swinging of said lever in a lock wheel releasing direction, and means biasing the lever into wheel locking relation;
a transfer plate for each bank pivotal about an axis parallel to the bank axis having rigid feeler tips riding respective interrupted formations of the wheel means;
means biasing the plate toward the interrupted formations to pivot the same upon alignment of all notches;
switches actuated by a respective said plate and interconnected to develop an output signal at the end of each count cycle;
transfer switch means operatively interposed between said plates to be changed from one setting to another upon pivoting of a respective plate at the end of a predetermined count cycle;
and like electro-mechanical means for rotationally displacing said input shaft in respective opposite directions upon actuation,
each including an actuating solenoid, an armature, a ratchet wheel connected to said shaft and cooperating locking and armature-moved drive pawls;
said solenoids being
 connectable to said transfer switch means for application of electrical count impulses to the solenoids alternatingly in respective successive count cycles, and also
 connectable independently of the transfer switch means to respective circuits developing impulses of respectively opposite counting sense.
2. A counting device comprising:
a first bank and a second like parallel bank of rotatable count indicating wheel means;
each wheel means including
 a rotatable number bearing element having a hub gear formation and a surface coaxial therewith interrupted by a notch, and a two-tooth interrupted gear formation,
 a rotatable lock wheel having a gear formation like to the hub gear formation and a circumferential series of locking teeth,
 a rotatable carrier member having an external spur gear portion and located between said series and element and rotatably supporting a pair of like pinions meshed with each other and respective said formations;
the wheel means of one bank having numerals ordered in sense reversed from that of the other bank;
an input shaft driven gear meshed with the spur gear portion of the lowest order wheel means of each bank;
a transfer wheel between each adjacent pair of wheel means having
 a gear portion in mesh with the spur gear portion of the higher order wheel means and
 another gear portion positioned to be engaged by teeth of said interrupted gear;
a transfer plate for each bank pivotal about an axis parallel to the bank axis having rigid feeler tips riding respective interrupted formations of the wheel means;
means biasing the plate toward the interrupted formations to pivot the same upon alignment of all notches;
switches actuated by a respective said plate and interconnected to develop an output signal at the end of each count cycle;
transfer switch means operatively interposed between said plates to be changed from one setting to another upon pivoting of a respective plate at the end of a predetermined count cycle;

and like electro-mechanical means for rotationally displacing said input shaft in respective opposite directions upon actuation,
each including an actuating solenoid, an armature, a ratchet wheel connected to said shaft and cooperating locking and armature-moved drive pawls;
said solenoids being
connectable to said transfer switch means for application of electrical count impulses to the solenoids alternatingly in respective successive count cycles, and also
connectable independently of the transfer switch means to respective circuits developing impulse of respectively opposite counting sense.

3. A counting device comprising:
a first bank and a second bank of rotatable count indicating wheel means, each counting wheel means including a spur gear portion for application of a wheel rotating input;
counter input shaft means commonly driving said banks for equal simultaneous increase and decrease of the numerical indication of respective banks;
tens transfer means operatively disposed between each pair of adjacent wheel means of each bank including
a Geneva tooth formation on the lower order wheel and
a transfer wheel having a gear formation position for meshing with said Geneva tooth formation and a second gear formation in constant mesh with the spur gear portion of the higher order wheel means;
means for transferring an increasing count function from one bank to the other including for each bank
an associated shiftably mounted member biased into engagement with all wheel means of the bank and
formations on respective wheel means encountering at bank zero indication to shift said member against bias,
the transfer means further including a two-position transfer switch controlling application in rotational sense to said counter section input shaft of impulses proportional to a quantity to be counted and adapted at opposite switch settings to apply said impulses for driving said input shaft in respective opposite senses;
and means for setting each bank to a desired count indication independently of the other.

4. A counter as described in claim 3, wherein to provide said setting means:
each wheel means comprises
a rotatable number indicia bearing element provided with a corresponding one of the member-shifting formations and with a hub gear formation,
a rotatable carrier element with said spur gear portion secured thereto,
a rotatable lock wheel having a gear formation and a circumferential series of locking teeth, and
a pair of pinions rotatably supported by the carrier in mesh with each other and respectively with said gear formations;
and there is included for each wheel means,
a lever having a lock formation complementary in shape to a portion of the locking teeth series for engaging and immobilizing the lock wheel and having a projection engageable with said locking teeth to rotate said locking wheel upon movement of the lever in a direction disengaging the lock formation,
and means biasing the lever toward a locking engagement with said teeth;
whereby the indicia bearing element is rotatable to desired setting by operation of said lever.

5. A counting device as described in claim 3 adapted to registering said impulses when electrical in character, including:
two like solenoidally actuated mechanisms each comprising a solenoid, armature, ratchet wheel and cooperating drive and lock pawls,
said ratchet wheel connected to drive said counter section input shaft oppositely to the other ratchet;
the solenoid coils each having a respective side connectable selectively
to respective one sides of input circuits providing impulses of opposite sense for add-subtract operation and
to said transfer switch for repeating predetermined count operation, and other sides commonly connected.

6. A counting device as described in claim 5 including differential means connecting the ratchet wheels to said input shaft comprising
differential input gears driven by said ratchet wheels,
a carrier member driving the input shaft, and
a pair of meshed pinions on the carrier meshed with the differential input gears.

7. A combination of rotatable numerical indicating wheel means with setting means therefor, comprising:
a rotatable numerical indicia-bearing element having a formation for rotationally driving a count input element of an adjacent like means of higher order and a hub-gear formation,
a rotatable carrier element having secured thereto a spur gear portion as a count input element meshed with driving means,
a rotatable lock wheel having a gear formation and a circumferential series of locking teeth,
a pair of pinions rotatably supported by the carrier in mesh with each other and respectively with said gear formations,
a lever
having a lock formation complementary in shape to a portion of the locking teeth series for engaging and immobilizing the lock wheel and having a projection engageable with said locking teeth to rotate said lock wheel upon movement of the lever in a direction disengaging the lock formation,
and means biasing the lever toward a locking engagement with said teeth,
whereby the said indicia bearing element is rotatable to a desired setting by operation of said lever.

8. A counting device comprising:
a first bank and a second bank of rotatable count indicating wheel means;
counter input shaft means commonly driving said banks for simultaneous equal increase and decrease of the numerical indication of respective banks;
tens transfer means operatively disposed between each pair of adjacent wheel means of each bank;
means for setting each bank to a desired count indication independently of the other;
means for transferring an increasing count function from one bank to the other including for each bank
an associated shiftably mounted member biased into engagement with all wheel means of the bank and
formations on respective wheel means encountering at bank zero indication to shift said member against bias,
the transfer means further including a two-position transfer switch,
and two like solenoidally actuated mechanisms
each comprising a solenoid, an armature, a ratchet wheel and cooperating drive and lock pawls,
said ratchet wheel connected to drive said counter input shaft oppositely to the other ratchet;

said transfer switch having a movable member connecting one side of a count impulse input circuit to one side of a respective solenoid at each switch position, and the other sides of said solenoid being commonly connected to the other side of said input circuit.

9. A counting devvice comprising:
a first bank and a second bank of rotatable count indicating wheel means;
counter input shaft means commonly driving said banks for simultaneous equal increase and decrease of the numerical indication of respective banks;
tens transfer means operatively disposed between each pair of adjacent wheel means of each bank;
means for setting each bank to a desired count indication independently of the other;
and two like solenoidally actuated mechanisms each comprising a solenoid, an armature, a ratchet wheel and cooperating drive and lock pawls, said ratchet wheel connected to drive said counter input shaft oppositely to the other ratchet;
the solenoid coils each having a respective side connected to one side of a respective input circuit providing impulses of opposite sense and other sides of said solenoids and circuits commonly connected, for add-subtract operation.

10. A counting device as described in claim 9 including differential means connecting the ratchet wheels to said input shaft comprising differential input gears driven by respective said ratchet wheels, a carrier member driving the said counter input shaft, and a pair of meshed pinions on the carrier meshed with the differential input gears.

11. A combination of rotatable numerical indicating wheel means with setting means therefore, comprising:
a rotatable numerical-indicia-bearing element having a formation for rotationally driving a count input element of an adjacent like means of higher order and a hub-gear formation,
a rotatable carrier element having secured thereto a spur gear portion as a count input element meshed with driving means,
a rotatable lock wheel having a gear formation and a circumferential series of locking teeth,
a pair of pinions rotatably supported by the carrier in mesh with each other and respectively with said gear formations,
a lever engageable with said locking teeth to rotate said lock wheel upon lever movement in one direction;
lock means engageable with a portion of the locking teeth series for immobilizing the lock wheel in successive angularly equi-spaced positions and releasable therefrom upon lever movement in said direction;
and means biasing the lever in the other direction; whereby the said indicia bearing element is rotatable to a desired setting by movable operation of said lever.

12. A combination of rotatable numerical indicating wheel means with setting means therefor, comprising:
a rotatable numerical-indicia-bearing element with gear formation,
a rotatable lock wheel having a gear formation and axially spaced therefrom a circumferential series of locking teeth,
a carrier element rotationally displaceable by a count input impulse,
and pinion means rotatably supported by the carrier element in mesh with said gear formations,
a lever
having a lock formation complementary in shape to a portion of the locking teeth series for engaging and immobilizing the lock wheel and having a projection engageable with said locking teeth to rotate said lock wheel upon movement of the lever in a direction disengaging the lock formation,
and means biasing the lever toward a locking engagement with said teeth,
whereby the said indicia bearing element is rotatable to a desired setting by operation of said lever.

13. In a counter as claimed in claim 3, including second and third two position switches each operatively associated with one of said shiftable members for controlling an external controlled device in accordance with the positions of said shiftable members so that a control signal is developed upon actuation of each switch by its associated shiftable member.

14. In a counter as claimed in claim 8, including seccond and third two-position switches each operatively associated with one of said shiftable members for controlling an external controlled device in accordance with the positions of said shiftable members so that a control signal is developed upon actuation of each switch by its associated shiftable member.

References Cited in the file of this patent
UNITED STATES PATENTS
2,269,330  Andren et al. _____ Jan. 6, 1942